(12) United States Patent
Smetana et al.

(10) Patent No.: US 8,974,341 B2
(45) Date of Patent: Mar. 10, 2015

(54) DRIVE DEVICE WITH AT LEAST ONE ELECTRIC ENGINE

(75) Inventors: Tomas Smetana, Herzogenaurach (DE); Philip Wurzberger, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/111,424

(22) PCT Filed: Mar. 12, 2012

(86) PCT No.: PCT/EP2012/054212
§ 371 (c)(1),
(2), (4) Date: Jan. 6, 2014

(87) PCT Pub. No.: WO2012/139833
PCT Pub. Date: Oct. 18, 2012

(65) Prior Publication Data
US 2014/0106930 A1     Apr. 17, 2014

(30) Foreign Application Priority Data
Apr. 13, 2011  (DE) .................. 10 2011 007 260

(51) Int. Cl.
| | |
|---|---|
| *F16H 3/72* | (2006.01) |
| *F16H 37/06* | (2006.01) |
| *B60W 10/11* | (2012.01) |
| *B60K 1/00* | (2006.01) |
| *B60K 17/02* | (2006.01) |
| *F16H 3/54* | (2006.01) |
| *H02K 7/112* | (2006.01) |
| *H02K 7/116* | (2006.01) |
| *B60W 10/08* | (2006.01) |
| *B60W 10/12* | (2012.01) |

(Continued)

(52) U.S. Cl.
CPC .................. *B60W 10/11* (2013.01); *B60K 1/00* (2013.01); *B60K 17/02* (2013.01); *F16H 3/54* (2013.01); *H02K 7/112* (2013.01); *H02K 7/116* (2013.01); *B60W 10/08* (2013.01); *B60W 10/12* (2013.01); *B60K 2001/001* (2013.01); *F16H 48/11* (2013.01); *F16H 2048/106* (2013.01); *F16H 2200/0021* (2013.01); *F16H 2200/0034* (2013.01); *F16H 2200/2005* (2013.01); *F16H 2200/2094* (2013.01); *H02K 2213/09* (2013.01)
USPC .................................. 475/8; 475/151; 475/220

(58) Field of Classification Search
USPC ............ 475/3–5, 8, 149, 151, 220, 221, 269, 475/296, 297, 317, 320, 321; 192/84.6, 192/18 B, 48.2, 66.2, 20
See application file for complete search history.

(56) References Cited

U.S. PATENT DOCUMENTS 3,203,525 A * 8/1965 Herbst ........................ 192/48.91
4,414,862 A * 11/1983 Svab .............................. 475/146

(Continued)

FOREIGN PATENT DOCUMENTS

| DE | 102005022926 B2 | 2/2007 |
|---|---|---|
| DE | 102009031214 A1 | 1/2011 |

(Continued)

*Primary Examiner* — Justin Holmes
(74) *Attorney, Agent, or Firm* — Simpson & Simpson, PLLC (57) ABSTRACT

A drive device having at least one electric machine, a gearbox, a differential which can be driven by the electric machine by means of the gearbox, at least one torque-fixed first operative connection between a first drive shaft of the electric machine and the gearbox.

11 Claims, 5 Drawing Sheets

(51) Int. Cl.
*F16H 48/11* (2012.01)
*F16H 48/10* (2012.01)

(56) References Cited

U.S. PATENT DOCUMENTS

| | | | | |
|---|---|---|---|---|
| 4,895,236 | A | * | 1/1990 | Sakakibara et al. ......... 192/84.6 |
| 6,763,922 | B2 | * | 7/2004 | Katou et al. ............... 192/85.63 |
| 6,827,663 | B2 | * | 12/2004 | Tucker-Peake ............... 475/231 |
| 8,591,378 | B2 | * | 11/2013 | Matsubara et al. ............... 477/3 |
| 2009/0275437 | A1 | * | 11/2009 | Kersting ........................... 475/5 |
| 2010/0267508 | A1 | | 10/2010 | Hvolka et al. |

FOREIGN PATENT DOCUMENTS

| | | |
|---|---|---|
| DE | 102010024147 A1 | 1/2011 |
| JP | 2006082748 A | 3/2006 |
| JP | 2010223298 A | 10/2010 |

\* cited by examiner

DRIVE DEVICE WITH AT LEAST ONE ELECTRIC ENGINE

CROSS-REFERENCE TO RELATED APPLICATIONS

The present application is the U.S. National Stage Application pursuant to 35 U.S.C. §371(1) of international Patent Application No. PCT/EP2012/05421.2, filed Mar. 12, 2012, which claims priority from German Patent Application No. 10 2011 007 260.8, filed. Apr. 13, 2011, which applications are incorporated herein by reference in their entireties.

FIELD OF THE INVENTION

The invention relates to a drive device with at least one electric engine, a manual transmission, a differential which can be driven by the electric engine via the manual transmission, and at least one torque-proof first effective connection between a first drive shaft of the electric engine and the manual transmission.

BACKGROUND OF THE INVENTION

German Patent Application No. 10 2005 022 926 B3 shows a drive device with at least one electric engine, a manual transmission, and a differential. The electric engine includes a drive shaft which can rotate about a rotational drive axis. The drive shaft is effectively connected to a coaxial transmission shaft of the two-gear manual transmission in a torque-proof fashion. A drive sprocket is arranged on the drive shaft, which can be driven rotationally via the drive shaft about the axis of rotation of the electric engine. The drive sprocket engages with its teeth an interim wheel, which is located on an interim shaft.

The interim shaft carries two loose pulleys which, in reference to the interim shaft, can rotate about the axis of rotation of the interim shaft. A clutch is formed by a speed transformer, a slide collar, and coupling elements at the loose pulleys. An effective connection can be established by the electric engine engaging and disengaging optionally the dog clutch of one or the other loose pulley via a slide collar, which is linearly mobile along the axis of rotation of the interim shaft.

The mechanically operated mechanic speed transformer includes an input member in the form of a roll and an output member in the form of a shifting digit. The effective connection between the roll, rotational about its own axis of rotation, and the shifting digit is established by the peripherally circulating guide path, which deflects in the longitudinal direction and engages the shifting digit. When pivoting the roll about the axis of rotation of the roll the shifting digit travels along the guide path and is moved longitudinally according to the deflection of the guide path. This results in the slide collar with its dog clutch optionally engaging or disengaging a dog clutch of one of the loose pulleys. During the engagement, the loose pulley is fixed in its rotation to the interim shaft and accordingly it can rotate with the interim shaft about the axis of rotation of said interim shaft.

Each loose pulley engages with its teeth an input wheel of the differential, which is respectively fastened on the differential cage in a torque-proof fashion so that an effective connection is established between the manual transmission and the differential.

The differential is a classical bevel differential gear, by which the torque is distributed from the differential cage via compensation pinions to the differential side gears of a left and a right axial shaft. The axial shafts are connected with driven wheels of a vehicle; however they may also lead to driven axles when the differential is used in a transfer gearbox. The input wheels are concentric in reference to the central axes of the differential side gears.

The axial distances of the axis of rotation of the drive axles, axially parallel at a distance from the axis of rotation of the interim shaft and from the central axes depend on the transmissions of the gear speeds and the size of the torque to be transmitted. The construction space accordingly required for the drive device may be disadvantageously large.

BRIEF SUMMARY OF THE INVENTION

The objective of the invention is to provide a variably applicable drive device, which can be easily assembled and which is compact.

According to the invention, in addition to a torque-proof first effective connection between the drive shaft of the electric engine, a clutch is provided of a second effective connection directly between the first drive shaft and the manual transmission, with the clutch being aligned coaxially in reference to the electric engine. Coaxial alignment of the clutch means that essentially all rotationally symmetric elements of the clutch, such as friction disks or friction cones or guide rings are arranged concentric in reference to the first axis of rotation. The engagement and disengagement device includes an actuator drive with a second drive shaft, which is at least pivotal or rotational about an axis. The axis of the second drive shaft is aligned axially parallel in reference to the first axis of rotation. Here, axially parallel means either that the axis of the drive shaft of the actuator is located on the first axis of rotation or is aligned parallel at a distance therefrom.

The first effective connection between the drive shaft of the electric engine and the manual transmission is, for example, a plug or flange connection (torque-proof) transmitting torque, preferably between the drive shaft and a connection shaft of a planetary drive of the manual transmission. The connection shaft is, for example, a sun gear of the planetary drive.

Here, one trained in the art understands connection shafts or connected shafts of planetary drives to represent drive shafts, driven shafts, and fixed members also called reaction members. Such connection shafts may include: sun gears also called central wheels, planet carriers also called bars, and hollow wheels [here, see "Zahnradgetriebe" [gear transmission] J. Loomann, third expanded edition, 1996, chapter 3.1, Definition of terms and titles].

The second effective connection is an effective connection, which can be engaged and disengaged, between the drive shaft of the electric engine and a connection shaft of the planetary drive, for example, a clutch between a shaft or a shaft of the sun gear. Preferably, the effective connection represents a clutch between the drive shaft of the electric engine and another connection shaft of the planetary drive, for example, between the drive shaft and a hollow wheel of the planetary drive. Due to the fact that the drive shaft and the sun gear are connected to each other in a torque-proof fashion, the manual transmission represents an effective connection, which can be engaged or disengaged, between the sun gear and the hollow wheel of the planetary drive. Coupling members for connecting the two connection shafts are, for example, friction disks, friction cones, and claws of dog clutches.

Here, by engaging or disengaging the manual transmission and thus by connecting or separating the drive shaft and the manual transmission, at least two different operating states (gears) of the multi-gear planetary gear can be shifted and here little construction space is required for the manual transmission. The elements of the electric engine and those of the clutch are arranged along the primary axis of the drive device side-by-side or encompass each other.

One embodiment of the invention provides for the first connection shaft being a sun gear, which engages with its teeth at least one set of planetary gears. The second connection shaft is a planet carrier at which the planetary gears are supported rotationally about their own axes of rotation, for example, on planetary pins. The third connection shaft is a hollow wheel, with its internal teeth engaging the teeth of the planetary gears.

In an engaged clutch a connection can be generated transmitting torque between the first connection shaft, thus between the sun gear or the drive shaft connected thereto in a torque-proof fashion, and the hollow wheel of the first planetary drive. When the electric engine in this operating state drives the sun gear, the sun gear and the planetary gears connected by the teeth to the sun gear are immobile in reference to each other because the hollow wheel cannot rotate in reference to the sun gear about the axis of rotation.

This way the planetary drive is bridged, the hollow wheel, the planet carrier, and the sun gear rotate jointly on that the torque or rotations originating in the drive shaft can be forwarded 1:1 in the effective connection between the electric engine and the differential.

When the clutch is disengaged and the hollow wheel is held fixed, for example, in reference to the environment, for example, in reference to a housing of the drive device, the drive shaft of the electric engine drives the sun gear, which sets the planetary gears in rotation, with the planetary gears being supported at the teeth of the stationary hollow wheel and setting the planet carrier into rotation, which in this way drives a connection shaft of the second planetary differential or the differential. The effective connection between the electro-motoric drive and the second planetary drive and/or the differential is determined by a speed increasing or speed reducing transmission ratio of the planetary drive.

The third effective connection is embodied between the drive shaft of the actuator drive for operating the clutch and a speed transformer and represents preferably a transmission connection. The actuator drive itself is optionally a linear drive, such as a ball screw, which is preferably driven by an electric engine. Alternatively, the actuator drive is embodied by an electric engine only. The speed transformer is, for example, a lever, a controller cylinder with a shifting fork or a shifting digit.

One embodiment of the invention provides that the speed transformer includes a rotational input member, which drives an output member in a linearly mobile fashion. The input member of the speed transformer optionally represents a crank, a drum, or a roll, equipped concentrically with external teeth. The output member of the speed transformer engages a clutch element of the clutch or a lever or another actuator means in a linear mobile fashion for engaging and disengaging a clutch and comprises a cam, pin, or shifting digit, in the widest sense of the word called a projection, or a fork engaging a clutch member, preferably, a slide collar.

The effective connection between the input member and the output member, by which the rotation is converted into a linear motion, is implemented, for example, such that a projection, a shifting digit, or the like engages a guide path of the input member such that this projection is moved in the guide path mandatorily guided in the longitudinal direction.

The transmission connection is, for example, a hollow wheel with internal teeth or a planet carrier of a planetary drive when the drive shaft of the drive and the axis of rotation of the drive shaft of the electric engine are arranged concentric in reference to each other for operating the clutch.

The effective connection between the manual transmission and the differential is preferably formed by a connection, which transmits torque, between two transmission shafts. One of the transmission shafts is, for example, a connection shaft of the planetary drive of the manual transmission, which is connected to the differential. This planetary drive can be the above-mentioned first planetary drive or another (second) planetary drive of the manual transmission. The other transmission shaft, the one of the differential, is, for example, a differential cage of a classic pinion differential or a planet carrier of a planetary differential.

One embodiment of the invention provides that the manual transmission includes two planetary drives effectively connected to each other. The first planetary drive and the second planetary drive may also in the simplest form respectively include the three connection shafts; sun gear, planet carrier, and hollow wheel, as well as a set of planetary gears or they may show more connection shafts and more planetary gears.

The first axis of rotation is the primary axis of the drive device, simultaneously representing the axis of rotation of the drive shaft of the electric engine and also simultaneously the central axis of rotation of the respective planetary drive. The electric engine, the planetary drives, and the differential are arranged coaxially in reference to each other with regards to the axis of rotation with here the axis of rotation of the bevel differential gear coinciding with the central axes of the side gears and thus the axis of rotation of the differential cage. The axis of rotation of the planetary differential is the same as the one of the sun gears.

Connections transmitting torque in a torque-proof fashion include friction fitting, force fitting, form fitting, or magnetic adhesion, by which torque can be transmitted with or without slippage from one of the connection shafts to the other connection shaft. Examples are serrations, plug-in connections between shafts, flanges, or clutches. Torque-proof connections are also transmission connections, such as sprocket stages or chain and belt drives, clutches are single or multiple disks, wet or dry clutches, dog or magnet clutches, and/or other suitable clutches. The elements of the clutch, such as friction disks or lamellae, pressure plates, clutch bodies, etc. are preferably embodied annularly and arranged concentric in reference to the axis of rotation.

One embodiment of the invention provides a brake between the third connection shaft, thus between the hollow wheel, and a housing of the drive device, by which the connection shaft can be braked and fixed in reference to the housing. By the combined application of clutch and brake by engaging or disengaging the clutch and a simultaneous braking or releasing of the brake the drive device is embodied in a more variable fashion.

By the brake the third connection shaft can be braked and fixed in reference to the housing. The brake is a wet or dry disk brake, a band or shoe brake, by which the third connection shaft can be braked and fixed in reference to the housing of the drive device directly at the housing or indirectly at supports connected to the housing in a torque-proof fashion.

Similar to the clutch, the brake is operated mechanically or alternatively via pressure means. The operating devices may be embodied and arranged like a clutch. Alternatively, as provided in one embodiment of the invention, the operation of the brake can engage and disengage together with an engagement and disengagement device for the clutch. When the clutch is disengaged, the manual transmission can remain in a neutral position or the brake is engaged. When the brake is released, the transmission can remain in the neutral position or the clutch is engaged.

Another embodiment of the invention provides a freewheel clutch in the manual transmission. The free-wheel clutch is located between the housing and the hollow wheel. When the brake is released, the hollow wheel is supported on the housing via the blocked freewheel, still immobilized, until the clutch is engaged and acceleration starts in the free wheel. This way, when shifting up, the duration of interrupted torque can be reduced.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
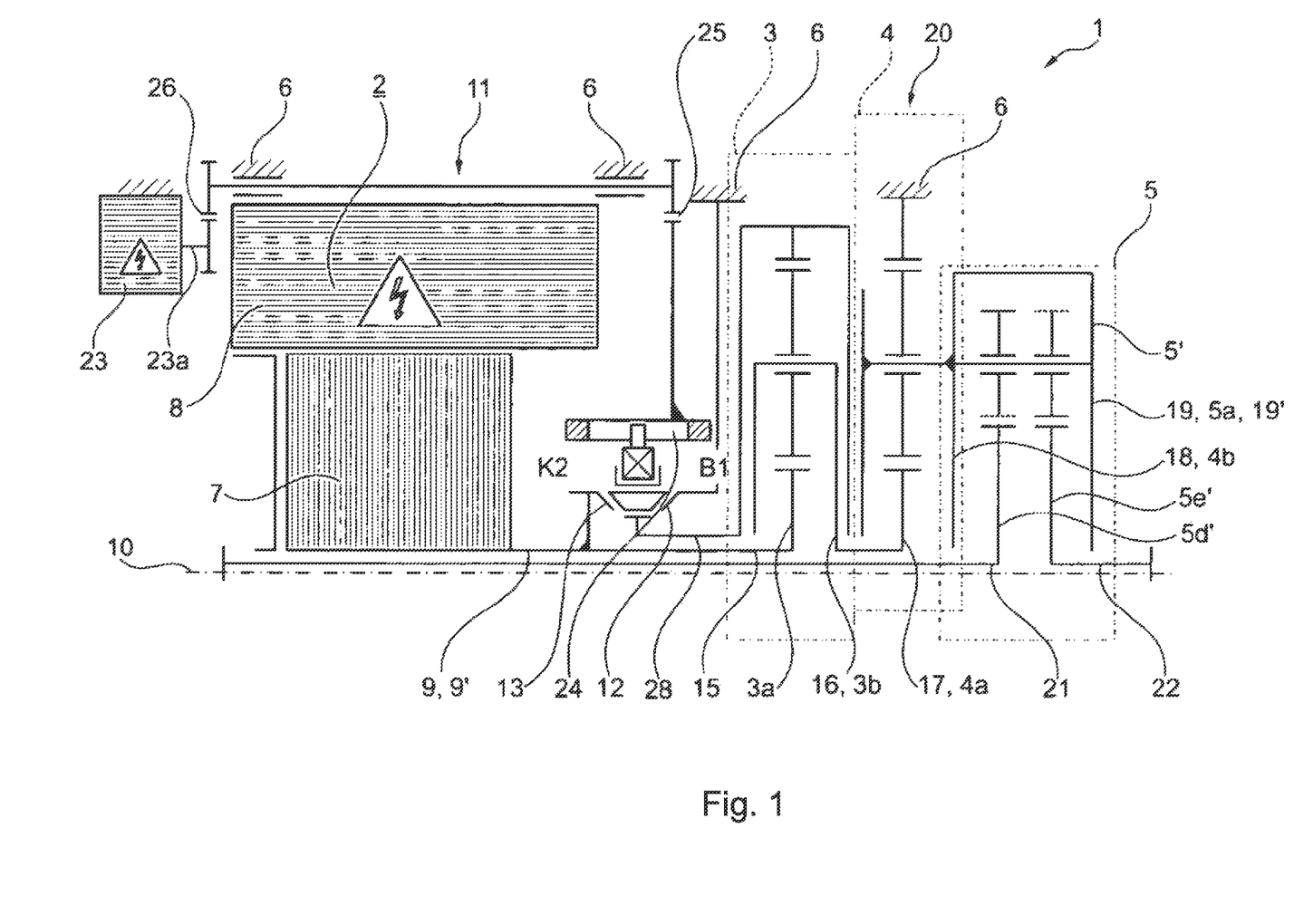
FIG. 1 is a longitudinal cross-section of a drive device.

FIG. 1 shows schematically a longitudinal cross-section through an exemplary embodiment of drive device 1. Drive device 1 comprises electric engine 2, clutch 13 (K2), brake 12 (B1), actuating device 11, a manual transmission in the form of two-gear planetary drive 20, and differential 5. Actuating device 11 is formed from actuator drive 23, transmission connection 25, transmission connection 26, and speed transformer 24.

Electric engine 2, clutch 13, and brake 12, two-gear planetary drive 20, and differential 5 are arranged coaxially in reference to each other and show axis of rotation 10 as a common primary axle and/or an axial extension thereof, rotor shaft 9, and thus drive shaft 9'. Axle 23a of the actuator drive, which may represent an axis of rotation or a pivotal axis, is arranged axially parallel in reference to axis of rotation 10 at a distance.

Electric engine 2 is accepted in a housing section of housing 6 of drive device 1, not completely shown in FIG. 1 and assembled from housing sections, and comprises rotor 7, stator 8, and rotor shaft 9. Stator 8 is placed at least torque-proof in housing 6. Rotor 7 is located concentrically and at least torque-proof on rotor shaft 9. Rotor shaft 9 is rotational with rotor 7 about axis of rotation 10 in reference to stator 8.

Two-gear planetary drive 20 comprises first planetary drive 3 and second planetary drive 4.

Rotor shaft 9 is drive shaft 9' of the electric engine and effectively connected via first connection shaft 15 to first planetary drive 3. First connection shaft 15 of first planetary drive 3 is sun wheel 3a, which can rotate about axis of rotation 10, which is either formed in one piece with drive shaft 9' or is embodied as a separate part and connected thereto in a torque-proof fashion, at least rotational about axis of rotation 10. First planetary drive 3 is effectively connected via second connection shaft 16 and third connection shaft 17 to second planetary drive 4. Second connection shaft 16 is planet carrier 3b of first planetary drive 3, which can rotate about axis of rotation 10. Third connection shaft 17 is sun gear 4a of second planetary drive 4, which can rotate about axis of rotation 10. Second connection shaft 16 and third connection shaft 17 are either embodied combined in one piece or as separately embodied parts, which are connected to each other at least in a torque-proof fashion.

Two-gear planetary drive 20 is effectively connected via fourth connection shaft 18 and fifth connection shaft 19 to differential 5. Fourth connection shaft 18 is planet carrier 4b of second planetary drive 4, which can rotate about axis of rotation 10. Fifth connection shaft 19 is differential cage 5a of differential 5 and is therefore combined shaft 19' of differential 5. Due to the fact that differential 5 represents planetary differential 5', differential cage 5a is planet carrier 5a' of planetary differential 5'.

Planetary differential 5' is effectively connected via sun gear 5d' to driven shaft 21 and via sun gear 5e' to driven shaft 22. Driven shafts 21 and 22, rotational about the axis of rotation independent from each other, each lead to the driven wheels, not shown, or to a driven shaft of a vehicle.

Figure 1A:
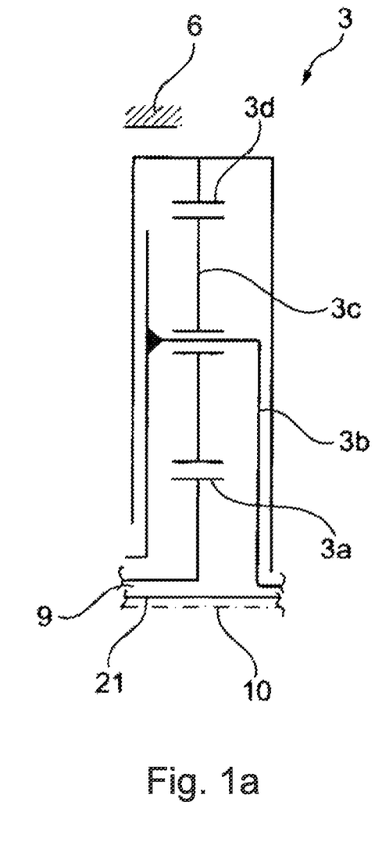
FIG. 1a is an enlarged detailed view of the first planetary drive shown in FIG. 1.

FIG. 1a shows in an enlarged fashion first planetary drive 3 in a detail of FIG. 1. First planetary drive 3 includes sun gear 3a, planet carrier 3b, set of planetary gears 3c, with only one planetary gear 3c being shown here, and hollow wheel 3d. Planet carrier 3b and hollow wheel 3d are supported in drive device 1, rotational about axis of rotation 10. Planetary gears 3c are supported, rotational on the planetary pin, at planet carrier 3b and engage the teeth of sun gear 3a and hollow wheel 3d.

Figure 1B:
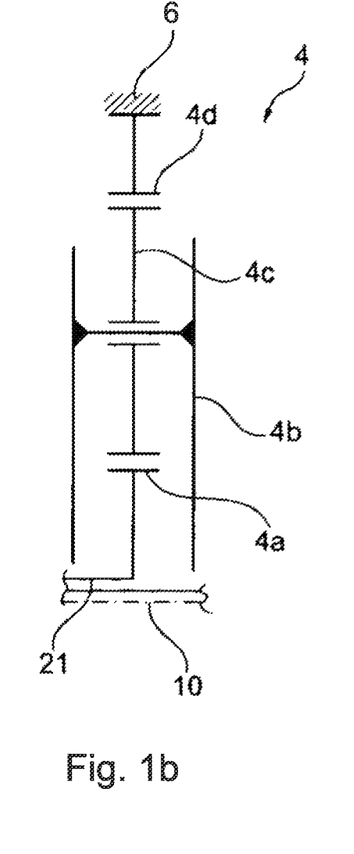
FIG. 1b is an enlarged detailed view of the second planetary drive shown in FIG. 1.

FIG. 1b shows second planetary drive 4 in an enlarged detail of FIG. 1. Second planetary drive 4 includes sun gear 4a, planet carrier 4b, set of planetary gears 4c, with only one planetary gear being shown, and hollow wheel 4d. Planetary gears 4c are supported rotational on the planetary pin at planet carrier 4b and engage the teeth of sun gear 4a and hollow wheel 4d. Planet carrier 4b is supported in the drive device, rotational about axis of rotation 10. Hollow wheel 4d is held stationary at housing 6.

Figure 1C:
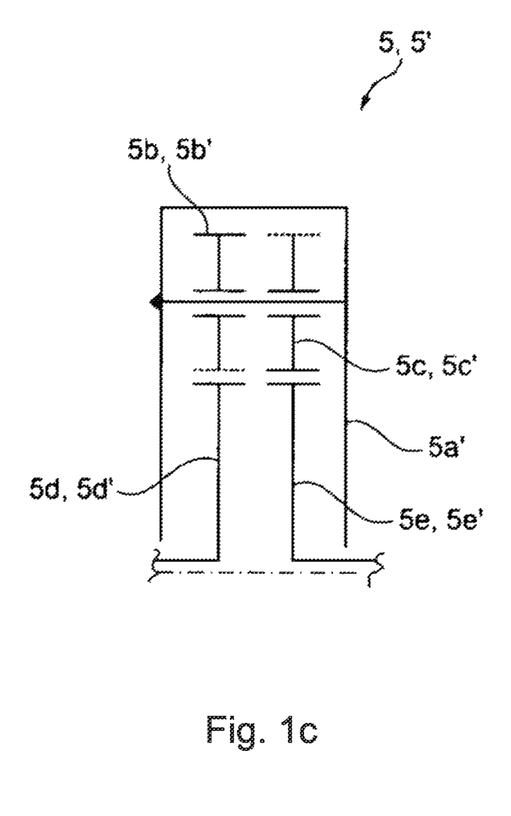
FIG. 1c is an enlarged detailed view of the planetary differential shown in FIG. 1.

FIG. 1c shows planetary differential 5' in an enlarged detail of FIG. 1. Planetary differential 5' includes planet carrier 5a, two sets of compensation wheels 5b and 5c in the form of planets 5b' and/or 5c', and driven wheels 5d and 5e in the form of sun gears 5d' and 5e'. Planetary gears 5b' of one set of planets engage the teeth of sun gear 5d' and planets 5e' the teeth of sun gear 5c'. Additionally, one planetary gear 5b' each of one set engages the teeth of planetary gear 5e' of the other set of planets. Both sets of planets 5b' and 5c' are supported rotational on planetary pins at planet carrier 5a'. Sun gears 5d' and 5e' are connected in a torque-proof fashion to driven shafts 12 and/or 22. Planet carrier 5a' and sun gears 5d' and 5e' are supported rotational in drive device 1.

Figure 1D:
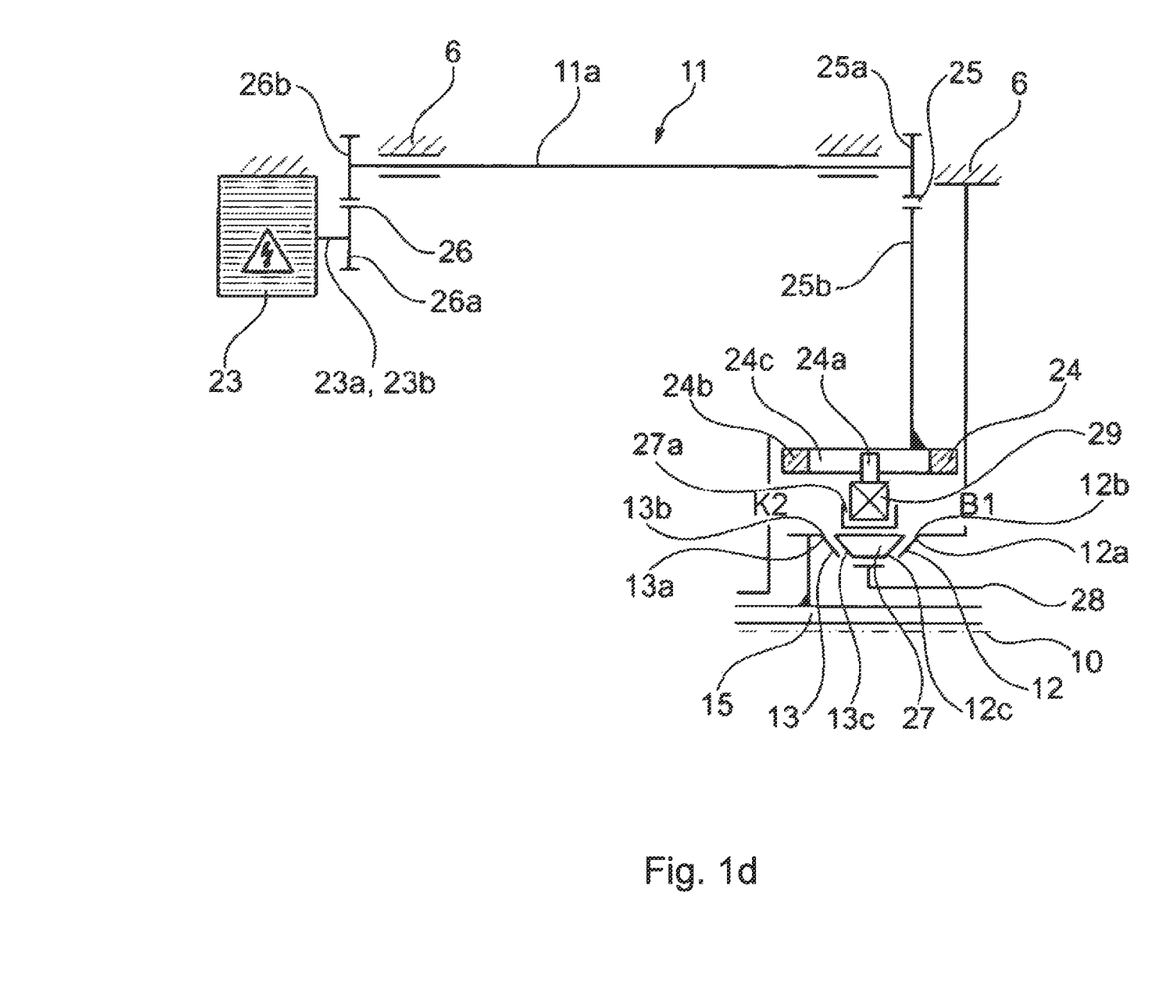
FIG. 1d is a view of the slide collar shown in FIG. 1.

FIG. 1d shows clutch 13, brake 12, and engagement and disengagement device 11 as a detail of FIG. 1.

Clutch 13 includes cone 13a, equipped with friction area 13b. Additionally, clutch 13 is provided with clutch member (27') in the form of slide collar 27, with friction area 13c being allocated thereto in a torque-proof fashion. Friction area 13c is conical and corresponds with regards to its geometry and friction behavior to friction area 13b and is located axially opposite thereto. Cone 13a, friction areas 13b and 13c, and slide collar 27 are arranged concentric in reference to axis of rotation 10. Pinion 13a is coupled in a torque-proof fashion to drive shaft 9.

Brake 12 shows cone 12a, equipped with conical friction area 12b. Friction area 12b is located opposite friction area 12c, allocated to slide collar 27, which corresponds to friction area 12b with regards to geometry and friction behavior. Cone 12a and friction areas 12b and 12c are aligned concentric in reference to axis of rotation 10. Cone 12a is arranged torque-proof with regards to its environment, thus, in reference to housing 6. Friction area 12b is allocated to cone 12a in a torque-proof fashion.

Slide collar 27 is connected torque-proof, however displaceable longitudinally along axis of rotation 10, to fifth connection shaft 28 representing hollow wheel 3d of first planetary drive 3. Annularly embodied slide collar 27 includes at its exterior perimeter annular groove 27a, with shifting digit 24a of speed transformer 24 engaging it. Shifting digit 24a is supported in annular groove 27a via axial bearing 29 acting dually in both longitudinal directions of axis of rotation 10. Axial bearing 29 can alternatively be a radial ball bearing, a dual-row angular ball bearing, or a four-point bearing.

Actuator drive 23 of engagement and disengagement device 11 represents an electric engine and comprises the rotor shaft of the electric engine as drive shaft 23b. Sprocket 26a of transmission connection 26 is connected in a torque-proof fashion to drive shaft 23b. Sprocket 26a engages the teeth of another sprocket 26b of the transmission connection, which is located stationary on interim shaft 11a. Interim shaft 11a represents a torque-proof connection between sprocket 26b and sprocket 25a of transmission connection 25 and is aligned axially parallel in reference to axis of rotation 10 at a distance, however, alternatively, it may also be aligned perpendicular in reference thereto. In this case, the sprockets are pinions, while sprockets 26a, 26b, 25a, and 25b are spur gears. Sprocket 25a engages the teeth of sprocket 25b, which is fastened torque-proof on the exterior perimeter of roll 24b of speed transformer 24. Roll 24b is aligned concentric in reference to axis of rotation 10 and includes guide path 24c, which extends essentially circumferential along roll 24b, however, which is deflected curved in the longitudinal directions, i.e., showing the same direction as axis of rotation 10.

Slide collar 27, starting from the neutral position shown in FIGS. 1 and 1d, thus aligned longitudinally like axis of rotation 10, can either be displaced towards cone 13a or towards cone 12a. For this purpose, actuator drive 23 is driven. Drive shaft 23a pivots or rotates and drives via transmission connections 26 and 25 roll 24b, which then pivots or rotates about axis of rotation 10. Guide path 24c moves in reference to shifting digit 24a, which adjusted to the curved path of guide path 24a is mandatorily moved longitudinally and entrains slide collar 27 in the longitudinal direction.

The first gear is engaged, in which friction areas 12b and 12c are connected in a friction locking fashion and thus, hollow wheel 3d is held fixed in reference to housing 6. Upon rotation of drive shaft 9 about axis of rotation 10, sun gear 3a rotates, which drives planetary gears 3c about their own axis of rotation in a rotary fashion. Planetary gears 3c are supported at the internal teeth of hollow wheel 3d and travel at a radial distance about the axis of rotation so that planet carrier 3b is set in rotation about axis of rotation 10 and thus drives sun gear 4a.

In the neutral position, friction areas 12c and 13c allocated to the slide collar are released from any friction-locking contact with the respective frictional partner.

A second gear is engaged by bringing friction areas 13b and 13c into a friction-locking contact with each other. This way, sun gear 3a and hollow wheel 3d are connected to each other in a torque-proof fashion. Due to the fact that sun gear 3a and hollow wheel 3d cannot distort any longer in reference to each other, the effect of first planetary drive 3 is cancelled. Drive shaft 9 drives sun gear 3a and hollow wheel 3d in the same direction of rotation about axis of rotation 10, thus, entraining planet carrier 3b and driving sun gear 4a.

Figure 2:
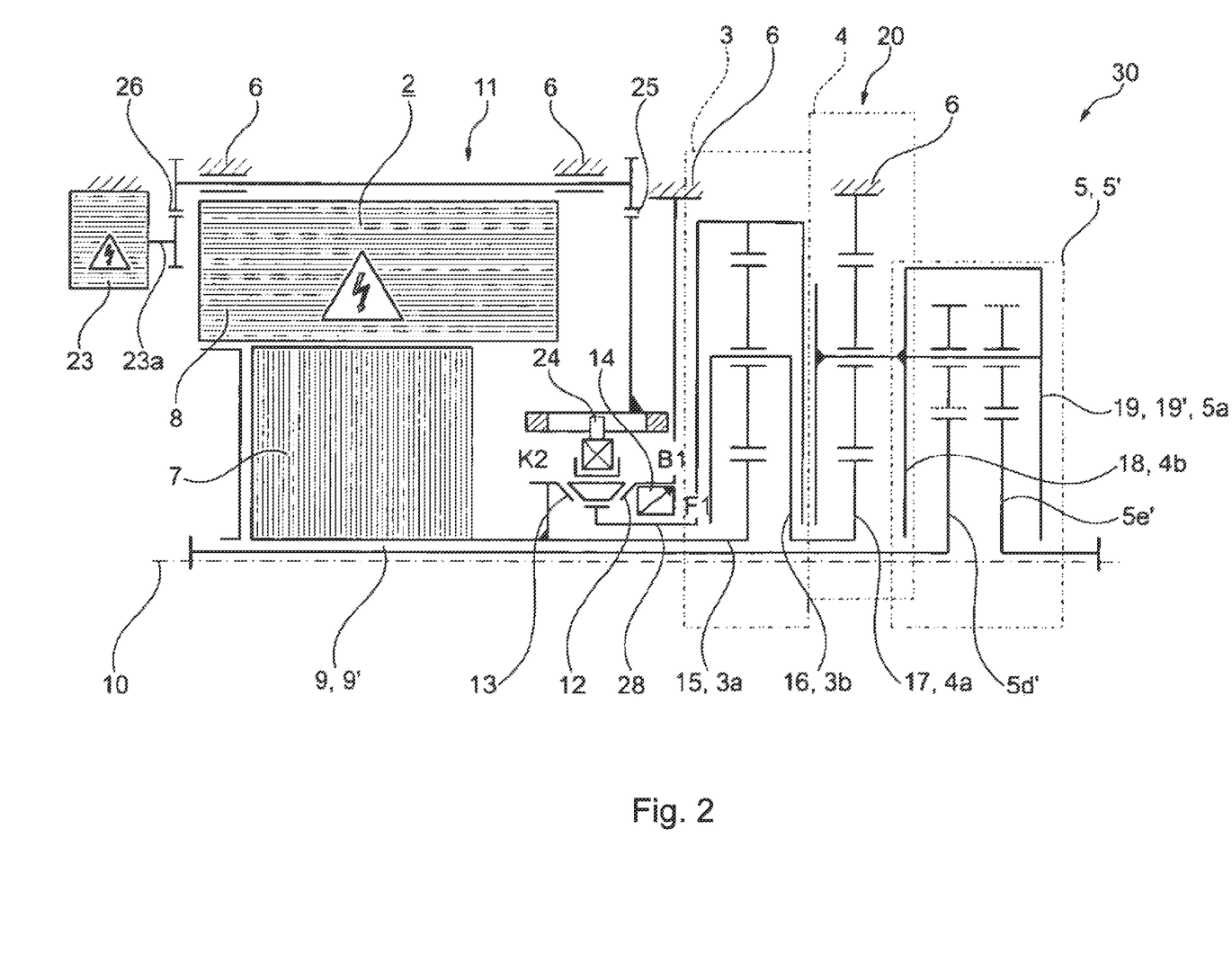
FIG. 2 is a drive device.

FIG. 2 shows drive device 30, which is generally designed and operates equivalent to drive device 1 according to FIG. 1. Drive device 30 however, unlike drive device 1, additionally includes free wheel 14 (F1), which is arranged concentric in reference to axis of rotation 10 next to brake 12 and is supported at the outside in a torque-proof fashion in reference to housing 6. At the inside, free wheel 14 rests torque-proof on fifth connection shaft 28. Free wheel 14 blocks, when shifting from the first gear up to the second gear, as long as friction areas 13b and 13c are friction-locked with each other. Free wheel 14 rotates unhindered when friction areas 13b and 13c are in a friction-locked contact with each other.

Figure 3:
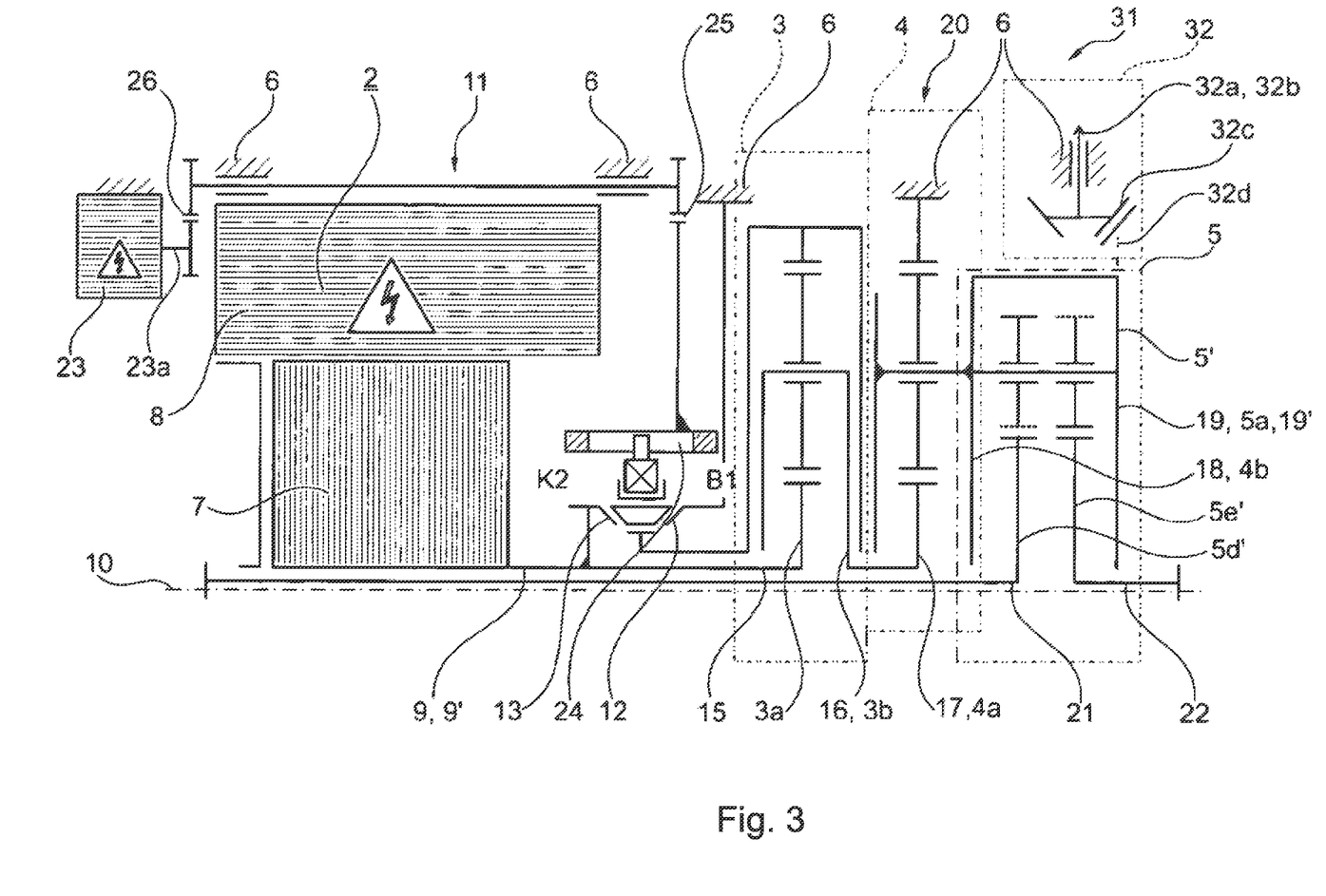
FIG. 3 is another drive device.

Drive devices 1 and 30 are drive devices independent from other drives. FIG. 3 however shows drive device 31, in which drive power can be inserted into drive device 31 via two drives, independent from each other or in cooperation. One of the drives is electric engine 2, the other drive may be an internal combustion engine or another electric engine. The drive power of the latter-most mentioned drive, not shown in FIG. 3, is introduced via bevel gear 32 into drive device 31.

Bevel gear 32 includes pinion drive 32a, which is supported rotational about its own axis of rotation 32b, for example, in housing 6. Axis of rotation 32b is aligned perpendicular in reference to axis of rotation 10. Sprocket 32c rests on pinion drive 32a, which engages the teeth with crown gear 32d. Crown gear 32d is optionally fastened torque-proof at planet carrier 4b or at planet carrier 5a'.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

| LIST OF REFERENCE NUMBERS | |
|---|---|
| 1 | Drive device |
| 2 | Electric engine |
| 3 | First planetary drive |
| 3a | Sun gear |
| 3b | Planet carrier |
| 3c | Planetary gear |
| 3d | Hollow wheel |

-continued

LIST OF REFERENCE NUMBERS

| | |
|---|---|
| 4 | Second planetary drive |
| 4a | Sun gear |
| 4b | Planet carrier |
| 4c | Planet |
| 4d | Hollow wheel |
| 5/5' | Differential/planetary differential |
| 5a/5a' | Differential cage/planet carrier |
| 5b/5b' | Compensation wheel/planet |
| 5c/5c' | Compensation wheel/planet |
| 5d/5d' | Driven wheel/sun gear |
| 5e/5e' | Driven wheel/sun gear |
| 6 | Housing |
| 7 | Rotor |
| 8 | Stator |
| 9/9' | Rotor shaft/drive shaft |
| 10 | Axis of rotation |
| 11 | Engagement and disengagement device |
| 11a | Interim shaft |
| 12 | Brake |
| 12a | Cone |
| 12b | Friction area |
| 12c | Friction area |
| 13 | Clutch |
| 13a | Cone |
| 13b | Friction area |
| 13c | Friction area |
| 14 | Free-wheel clutch |
| 15 | First connection shaft |
| 16 | Second connection shaft |
| 17 | Third connection shaft |
| 18 | Fourth connection shaft |
| 19/19' | Fifth connection shaft/combined shaft |
| 20 | Two-gear planetary drive |
| 21 | Drive shaft |
| 22 | Drive shaft |
| 23 | Actuator drive |
| 23a | Axis |
| 23b | Drive shaft |
| 24 | Speed transformer |
| 24a | Shifting digit |
| 24b | Roll |
| 24c | Guide path |
| 25 | Transmission connection |
| 25a | Sprocket |
| 25b | Sprocket |
| 26 | Transmission connection |
| 26a | Sprocket |
| 26b | Sprocket |
| 27/27' | Slide collar/clutch member |
| 27a | Annular groove |
| 28 | Fifth connection shaft |
| 29 | Axial bearing |
| 30 | Drive device |
| 31 | Drive device |
| 32 | Bevel drive |
| 32a | Pinion drive |
| 32b | Axis of rotation |
| 32c | Gear |
| 32d | Crown gear |

What is claimed is:

1. A drive device, comprising:
a first drive shaft;
at least one electric motor connected to a first gear via said first drive shaft;
a manual transmission connected to said first drive shaft via said first gear and via an engageable connection, said engageable connection arranged between said first gear and a second gear;
a differential which can be driven by the electric engine via the manual transmission;
a clutch operatively arranged to connect said first gear with said second gear to establish said engageable connection;
a brake operatively arranged to fix said second gear; and,
an actuator drive operatively arranged to engage said clutch or said brake.

2. The drive device recited in claim 1, further comprising a second drive shaft arranged a distance from said first drive shaft.

3. The drive device recited in claim 1, in which the actuator drive comprises another electric engine.

4. The drive device recited in claim 1, in which the manual transmission represents a planetary drive with at least one planetary gear.

5. The drive device recited in claim 4, wherein said first gear is of a first planetary drive of the manual transmission.

6. The drive device recited in claim 5, wherein said clutch comprises a clutch member operatively arranged to engage and disengage two connection shafts of the first planetary drive.

7. The drive device recited in claim 5, comprising a second planetary drive operatively arranged to connect the first planetary drive and the differential.

8. The drive device recited in claim 1, in which the differential represents a planetary differential with at least a third planetary drive.

9. The drive device recited in claim 1, comprising a transmission connection between the second drive shaft and a speed transformer, by which the speed transformer can be driven.

10. A drive device, comprising:
a drive shaft;
a first planetary gear rotatably secured to said drive shaft via a non-rotatable connection, said first planetary gear having a first carrier;
a second planetary gear non-rotatably connected to a housing and said first carrier;
a differential operatively arranged to transmit torque from said second planetary gear to an output means;
a clutch secured to the drive shaft and operatively arranged to lock said first planetary gear;
an electric motor operatively arranged to drive said drive shaft; and,
an actuator operatively arranged to actuate said clutch.

11. A drive device, comprising:
an input means;
an output means;
a clutch;
a first planetary gear comprising a first carrier; and,
a second planetary gear comprising a second carrier;
wherein when said clutch is engaged a first torque path flows from said input means to said first planetary gear in a 1:1 gear ratio and then to the second planetary gear via said first carrier and then to the output means via said second carrier; and,
wherein when said clutch is disengaged a second torque path flows from said input means to said first planetary gear in a second gear ratio and then to the second planetary gear via said first carrier and then to the output means via said second carrier.

* * * * *